United States Patent [19]
Saunders

[11] 3,730,554
[45] May 1, 1973

[54] VEHICLE TRAILER SWAY CONTROL SYSTEM

[76] Inventor: Eldon John Saunders, 13420 Frazho, Warren, Mich.

[22] Filed: Mar. 17, 1971

[21] Appl. No.: 125,296

[52] U.S. Cl. ............................ 280/406 A, 280/446 B
[51] Int. Cl. .................................................. B62d 53/00
[58] Field of Search ............ 280/406, 406 A, 446 B, 280/446

[56] References Cited

UNITED STATES PATENTS

| | | | |
|---|---|---|---|
| 3,194,584 | 7/1965 | Reese | 280/406 A |
| 3,294,421 | 12/1966 | Mathisen | 280/446 B |
| 3,552,771 | 1/1971 | Hendricks | 280/406 A |
| 3,542,395 | 11/1970 | Millikan | 280/406 A |

FOREIGN PATENTS OR APPLICATIONS 1,924,742  11/1969  Germany ........................ 280/446 B

*Primary Examiner*—Leo Friaglia
*Attorney*—William L. Fisher

[57] ABSTRACT

Improvement in a vehicle trailer sway control system is disclosed for use with weight-equalizing hitches of the type having a pair of weight-equalizing bars and a pair of lifting means for respectively lifting the free ends of said bars, said lifting means respectively supporting a pair of laterally and outwardly projecting ledges from the trailer tongue, said ledges being supported in respective hanging positions on opposite sides of said trailer tongue, said improvement consisting of a pair of friction brake means constructed as removeable attachments for existing weight-equalizing hitches of said type by comprising, respectively, a pair of elongate supporting members having respective open-ended cavities therein engageable with said ledges, respectively, for rendering said friction brake means capable of being placed over and lowered upon said ledges, respectively, said elongate supporting members, when engaged on said ledges, respectively, being held fast in respect thereto and being disposed beneath said equalizing bars, respectively, and in weight-supporting relationship thereto, each said elongate supporting member carrying thereon brake shoe means moveable in respect thereto and force-applying means operative upon said brake shoe means for applying braking pressure against the respective equalizing bar to resist trailer sway.

8 Claims, 4 Drawing Figures

PATENTED MAY 1 1973
3,730,554
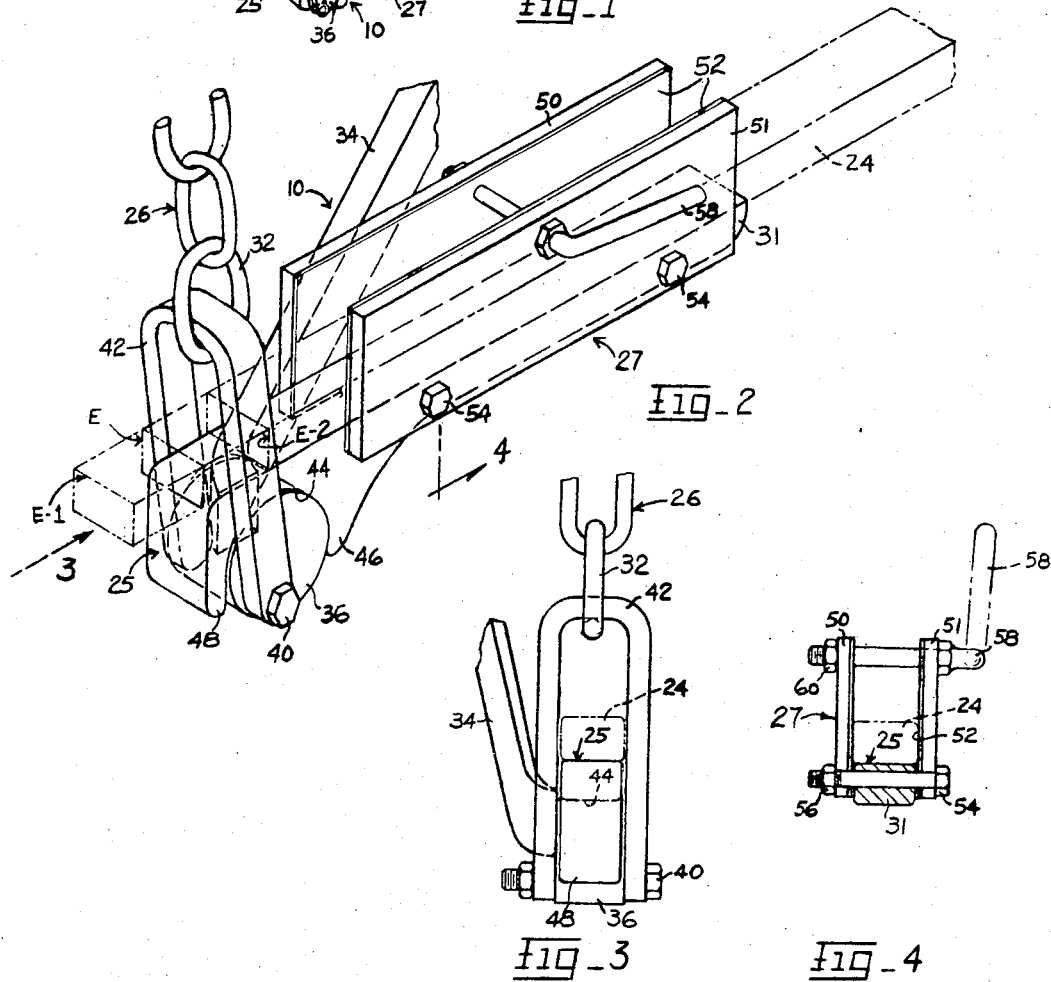
ELDON JOHN SAUNDERS
INVENTOR
BY William L. Fisher Esq.
HIS ATTORNEY 3,730,554

VEHICLE TRAILER SWAY CONTROL SYSTEM

My invention relates to vehicle trailer sway control systems operative between a vehicle trailer and the towing vehicle to reduce the sway of the trailer as it is being towed.

The principal object of my invention is to provide for use with weight equalizing hitches having pairs of equalizing bars a vehicle trailer sway control system comprising vehicle trailer sway control means and method by which a friction brake mechanism is supported on a horizontal ledge or shelf of lifting means hanging from each side of the trailer tongue; the free rear ends of the equalizing bars are supported, respectively, on said friction brake mechanisms which adjustably compress brake lining material against the respective equalizing bar to apply a friction braking pressure thereon so that said equalizing bar, while longitudinally slidable in the respective brake mechanism for turning purposes, is resisted in such sliding movement by said braking pressure for sway control purposes.

The foregoing object of my invention and the advantages thereof will become apparent during the course of the following description, taken in conjunction with the accompanying drawings, in which:

FIG. 1 is a fragmentary perspective view of a vehicle trailer equipped with a sway control system embodying my invention;

FIG. 2 is a like view on a larger scale; and

FIGS. 3 and 4 are, respectively, end elevational and vertical sectional views of the structure of FIG. 2.

Referring to the drawings in greater detail, 10 generally designates said embodiment of vehicle trailer sway control system shown in FIG. 1 installed on a trailer hitch system 12 which includes as a part thereof a vehicle tow bar 14 to which is fastened an equalizing bar holder and ball mount 16 on the top of which is fast a ball connector 18, for engaging a socket connector 20 which is a part of a tongue 22 of a trailer to be towed. A pair of equalizing bars 24 are pivotally connected via their front ends to said ball mount 16. Said embodiment 10 comprises a pair of lifting means 26 and a pair of friction brake mechanisms 27. Each said lifting means 26 has its upper end constructed to fasten to one side of the trailer tongue 22 in vertically adjustable positions and on its lower end has a horizontal supporting ledge or shelf beneath said free end of the respective equalizing bar 24. In the instance, said upper end of each said lifting means 26 includes a bracket 28 made fast to one side of the tongue 22 having a crotch structure 29 having an upright rod 30 which engages the upper end of a chain 32 to hold the latter in vertically adjustable positions in respect to the tongue 22. In the instance each said horizontal supporting ledge or shelf is in the form of a generally cylindrical cam 36 formed on the rear end of a cam arm 34 which is pivotally connected via its front end to a bracket 38 made fast by U-shaped bolts 39 to the same side of the tongue 22 ahead of the bracket 28. Each said cam 36 carries a pivot pin 40 which extends therethrough and by which the rear end of the respective cam arm 34 is lifted by a clevis 42 connected to the lower end of said chain 32 having its spaced apart arms pivotally connected to said pivot pin 40.

Each said friction brake mechanism 27 has a base 25 and is supported upon the respective cam 34 and secured thereto against movement longitudinally of the trailer tongue by a downwardly facing holding means at the rear end of said base 25 in the form of a concave saddle 44 having front and rear downwardly extending portions 46 and 48, respectively, which extend downwardly below the top of the respective cam 36 to lock the latter and said saddle 44 together. In the instance said saddle 44 is integrally formed with said base 25 which has a forward bar portion 31 extending longitudinally forwardly from said saddle 44 beneath the respective equalizing bar 24. Each said brake mechanism 27 has a pair of moveable plates 50 and 51 having brake lining material 52 extending thereover and fastened thereto which plates 50 and 51 are disposed on opposite sides of the respective equalizing bar 24 and upstand from said forward bar portion 31. Said plates 50 and 51 and said forward bar portion 31 are provided with longitudinally spaced apart transverse apertures in alignment with each other through which fastening bolts 54 extend having threaded ends which lock in locknuts 56 made fast to the outside face of the plate 50. Said plates 50 and and 51 are also provided with transverse apertures in alignment with each other which are disposed centrally between and above those for the bolts 54 and through which a handled fastening bolt 58 extends having a threaded end which locks in a locknut 60 made fast to the outside face of the plate 50. The transverse width of the base 25 is less than that of the respective equalizing bar 24 against which said brake mechanism 27 is to friction brake so that in applying a braking pressure via the brake lining material 52 to said equalizing bar 24 the plates 50 and 51 will be capable of being transversely compressed together without bottoming against said base 25.

In operation of said embodiment 10, the same installed on a trailer tongue of a trailer equipped with a weight equalizing type hitch, such as the tongue 22, and, in the instance, the pair of lifting means 26, each consisting of the bracket 28, the rod 30, the chain 32, the clevis 42, the cam arm 34 and the cam 36 thereon, and the bracket 38, are normally supplied by the manufacturer of the particular weight equalizing hitch. In other cases a pair of lifting means equivalent to the lifting means 26 must be supplied as a part of my invention. For this purpose a rectangular cross-section hanger bar having a vertical upper end and a right angularly bent horizontal lower end serving as a horizontal ledge or shelf which fits between the portions 46 and 48 and engages and lifts up the saddle 44 will suffice for each said lifting means. Said vertical upper end has vertically spaced apart apertures therein for fastening said hanger bar to the respective trailer tongue in vertically adjustable positions. Said horizontal lower end of said hanger bar should project laterally outwardly beyond the base 25 so that it may be provided with an aperture for carrying cotter type means to hold the friction brake mechanism 27 captured between said cotter type means and said vertical upper end against movement laterally of said hanger bar in somewhat the same way that the clevis 42 captures the base 25 against movement laterally of the cam arm 34. In the case of said hanger bar or in the case of the cam arm 34 the saddle 44 is laid over either said horizontal lower end or the cam 36 or whatever horizontal ledge or shelf is provided by lifting means equivalent to the lifting means 26. The free rear end of respective equalizing bar, such as the bar 24, is then laid over the forward bar portion 31 of said base 25. The longitudinal position of said horizontal ledge, such as the cam 36, is adjusted in respect to the trailer tongue 22 so that the rear end wall of said equalizing bar 24 is disposed over the rear half of said cam 36 when the towing vehicle is not turned in respect to the vehicle trailer as shown and indicated at E in FIG. 2 for said rear end wall. The rearwardmost position of the respective equalizing bar 24 (for example in the sharpest right turn of the towing vehicle for the right hand equalizing bar on the right (or the passenger) side of the towing vehicle) is shown and indicated at E-1 in FIG. 2 for said rear end wall. The longitudinal width of said horizontal ledge is constructed so that in the forwardmost position of the respective equalizing bar 24 (for example in the sharpest left turn of the towing vehicle for the right hand equalizing bar) its rear end wall as shown and indicated at E-2 in FIG. 2 is still disposed over the said horizontal ledge as shown in FIG. 2 in the case of the cam 36. The manufacturer of the particular weight equalizing hitch designs the same so that this will always be the case when the weight equalizing hitch is properly installed on the vehicle trailer and the towing vehicle. The manufacturer of said hanger bar in cases where this must be supplied must design the same so that this will always be the case when an existing equalizing hitch without a horizontal supporting ledge must be equipped with my vehicle trailer sway control system. After both said brake mechanisms 27 are so installed on the two equalizing bars 24 and the towing vehicle is straight in respect to the vehicle trailer the desired braking pressure is applied to each equalizing bar by first tightening the respective fasteners 54 with a wrench to effect a major adjustment of the applied braking pressure and then tightening the respective fastener 58 by hand by rotating the handle thereof to effect a minor adjustment of the applied braking pressure. The vehicle trailer is then in condition to be safely towed by the towing vehicle with a minimum of sway. The brake mechanisms 27, while applying braking pressures to the equalizing bars 24 for sway control purposes, permit longitudinal movement thereof for turning purposes.

My vehicle trailer sway control system is convenient to install on existing weight equalizing hitches and does not require special connections on the vehicle trailer tongue or on the hitch coupling part carried by the towing vehicle. My vehicle trailer sway control system is able to obtain a maximum amount of sway control for a given amount of applied braking pressure because the friction braking is applied on the free rear ends of the pair of equalizing bars which do the lifting for weight equalization and because such application is applied at the maximum spaced apart distance transversely of the trailer and at the maximum vertical distance below the ball and socket connection between the towing vehicle and the trailer.

It will thus be seen that there has been provided by my invention, a vehicle trailer sway control system in which the object hereinabove set forth together with many thoroughly practical advantages has been successfully achieved. While a preferred embodiment of my invention has been shown and described it is to be understood that variations and changes may be resorted to without departing from the spirit of my invention as defined by the appended claims.

What I claim is:

1. Improvement in a vehicle trailer sway control system for use with weight-equalizing hitches of the type having a pair of weight-equalizing bars and a pair of lifting means for respectively lifting the free ends of said bars, said lifting means respectively supporting a pair of laterally and outwardly projecting ledges from the trailer tongue, said ledges being supported in respective hanging positions on opposite sides of said trailer tongue, said improvement consisting of a pair of friction brake means constructed as removable attachments for existing weight equalizing hitches of said type by comprising, respectively, a pair of elongate supporting members having respective open-ended cavities therein engageable with said ledges, respectively, for rendering said friction brake means capable of being placed over and lowered upon said ledges, respectively, said elongate supporting members, when engaged on said ledges, respectively, being held fast in respect thereto and being disposed beneath said equalizing bars, respectively, and in weight-supporting relationship thereto, each said elongate supporting member carrying thereon brake shoe means moveable in respect thereto and force-applying means operative upon said brake shoe means for applying a braking pressure against the respective equalizing bar to resist trailer sway.

2. Improvement in a vehicle trailer sway control system as claimed in claim 1, each said elongate supporting member having its respective cavity in the form of an arcuate cam surface for mating with a ledge in the form of an arcuate cam.

3. Improvement in a vehicle trailer sway control system as claimed in claim 1, each said brake shoe means moveable transversely of its respective elongate supporting member for applying a transversely-operative braking pressure against opposite sides of the respective equalizing bar, and each said elongate supporting member being narrower in transverse width than the respective equalizing bar it supports.

4. Improvement in a vehicle trailer sway control system as claimed in claim 3, each said force-applying means operative transversely of its respective elongate supporting member and comprising two sets of fastening means operative, respectively, below and above the respective equalizing bar.

5. Improvement in a vehicle trailer sway control system as claimed in claim 4, each said lower set of fastening means operative through the body of the respective elongate supporting means and serving as a major brake adjustment means for varying the braking pressure applicable to the respective equalizing bar.

6. Improvement in a vehicle trailer sway control system as claimed in claim 5, each said upper set of fastening means operative outside the body of the respective elongate supporting means and serving as a minor brake adjustment means for varying the braking pressure applicable to the respective equalizing bar.

7. Improvement in a vehicle trailer sway control system as claimed in claim 1, each said friction brake means having brake adjustment means for varying the braking pressure applicable to the respective equalizing bar.

8. Improvement in a vehicle trailer sway control system as claimed in claim 1, each said friction brake means having both major and minor brake adjustment means for varying the braking pressure applicable to the respective equalizing bar.

* * * * *